Sept. 14, 1937.  W. V. EMERY  2,093,394
METHOD AND APPARATUS FOR FORMING AND FEEDING WELDING MATERIAL
Filed July 13, 1931  2 Sheets-Sheet 1
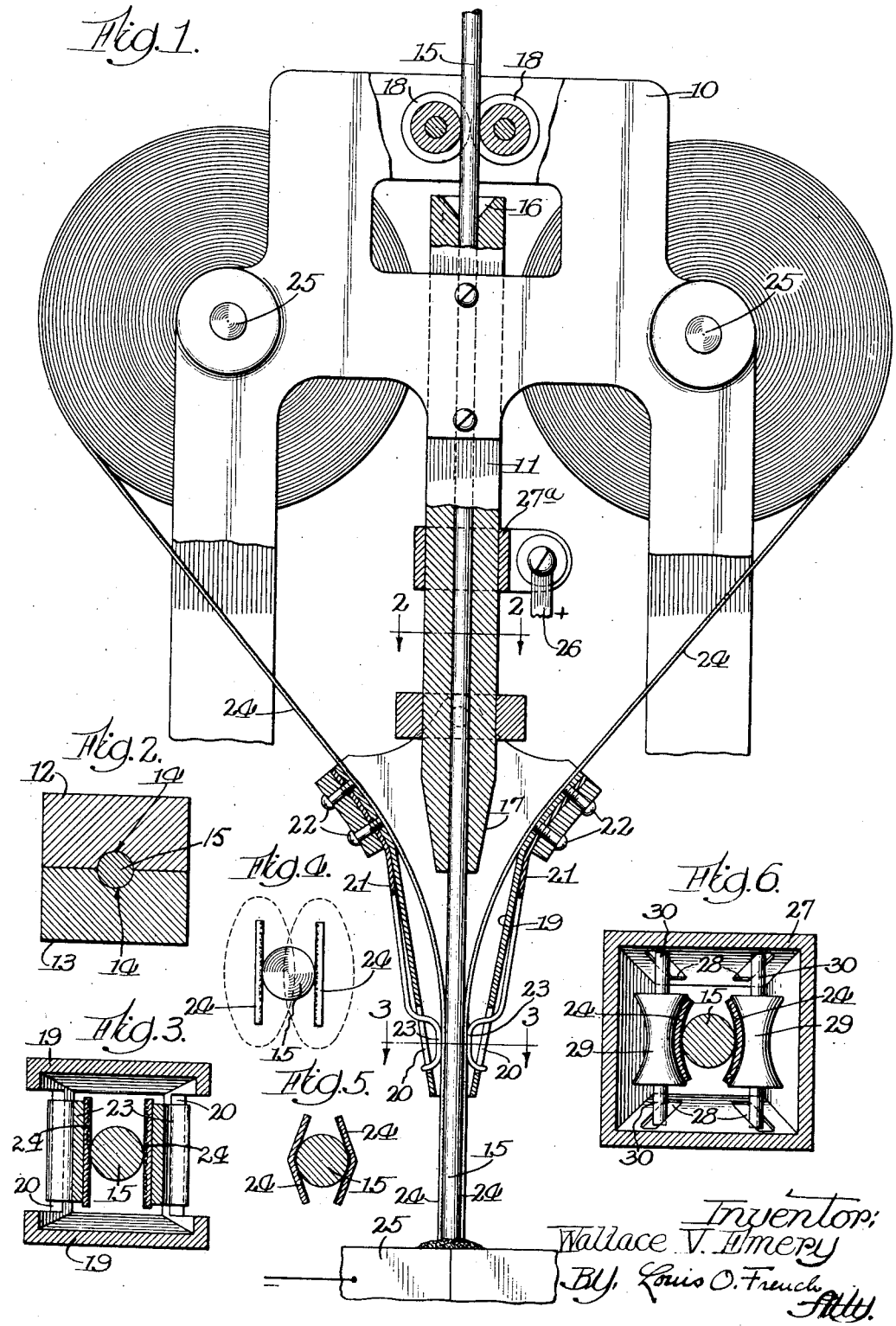

Sept. 14, 1937.  W. V. EMERY  2,093,394
METHOD AND APPARATUS FOR FORMING AND FEEDING WELDING MATERIAL
Filed July 13, 1931  2 Sheets-Sheet 2
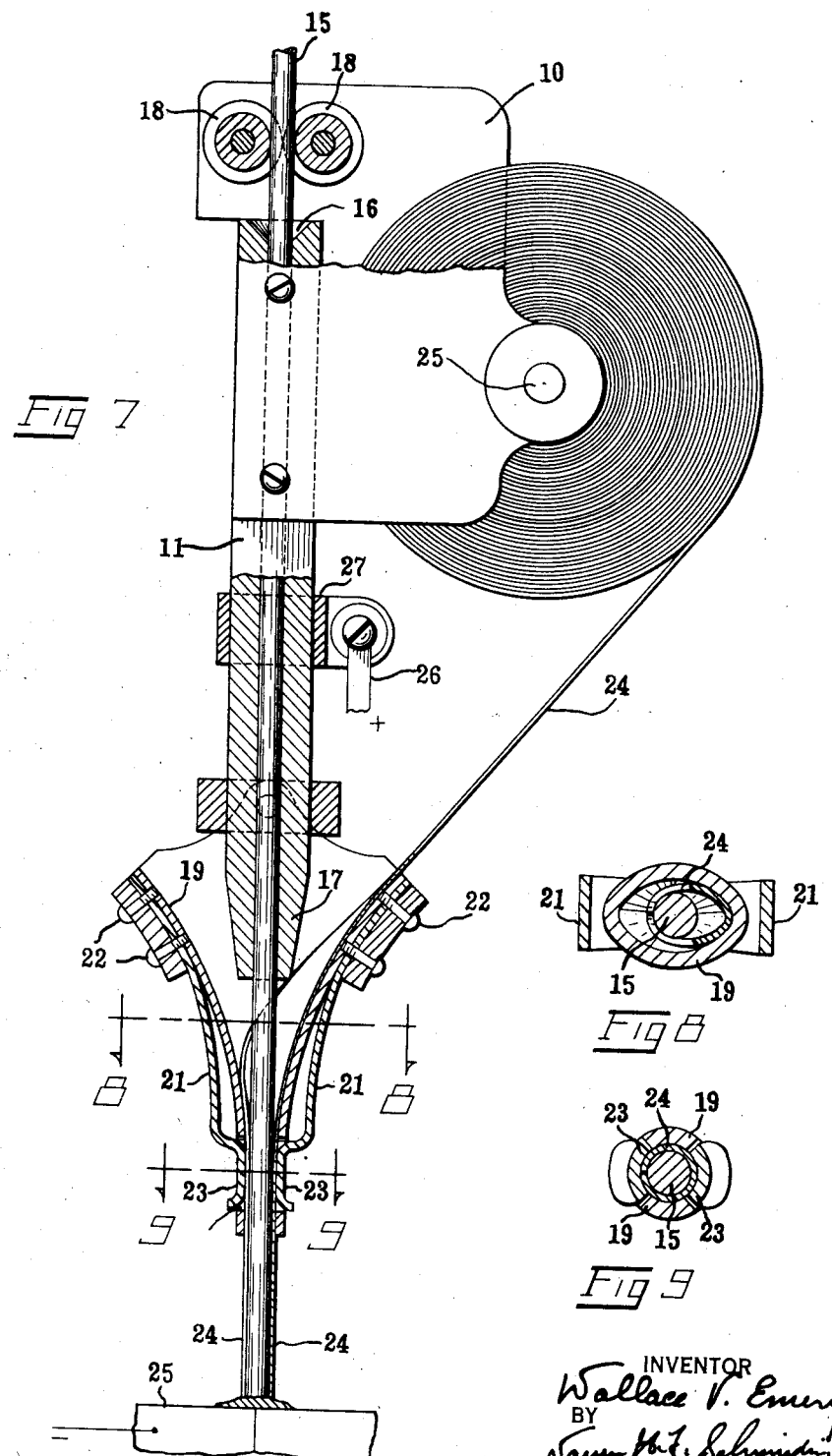

Patented Sept. 14, 1937

2,093,394

UNITED STATES PATENT OFFICE 2,093,394

METHOD AND APPARATUS FOR FORMING AND FEEDING WELDING MATERIAL

Wallace V. Emery, West Milwaukee, Wis., assignor to Charles F. Perner, Yonkers, N. Y.

Application July 13, 1931, Serial No. 550,509

6 Claims. (Cl. 219—8)

This invention relates to a method and apparatus for forming a welding rod and feeding the same to the work.

One of the objects of the invention is to provide a method and apparatus whereby the fluxing or flame producing element is supplied to the welding rod continuously as the welding rod is used and advanced with the rod into the welding zone. More particularly according to the present invention, the welding material such as a rod or wire, is supplied with the fluxing or flame producing element by the feeding thereto of such element in the form of strips supplied to the opposite sides of the rod or wire and brought into operative association therewith and fed thereto in such relation to the zone of welding.

A further object of the invention is to provide an apparatus whereby the flux carrying or flame producing agent will be fed as a strip or strips to the rod and will be held frictionally in contact with the rod so that when the rod is fed, the tractive effort or frictional force of the rod with respect to the strip, which is greater than the friction exerted between the other face of the strip and the holding means, will cause the strip or strips to be advanced with the rod or wire, with the result that the rod and its flux and flame producing agent will be supplied to the work directly it is formed.

A further object of the invention is to provide an improved structure of the character above described which may be readily attached to automatic arc welding machines and produce thereby a shielded arc principle in such a machine using a continuous wire feed.

The invention further consists in the several features hereinafter set forth and more particularly defined by claims at the conclusion hereof.

In the drawings, Fig. 1 is a view partly in elevation, partly in section and partly broken away, diagrammatically illustrating an apparatus for carrying out the invention and certain novel features of the apparatus.

Fig. 2 is a detail sectional view on an enlarged scale taken on line 2—2 of Fig. 1;

Fig. 3 is a detail sectional view on an enlarged scale taken on the line 3—3 of Fig. 1;

Fig. 4 is an end view of the rod and strips illustrating the manner or method of producing a shielded arc.

Fig. 5 is a view similar to Fig. 4 showing a somewhat modified form thereof;

Fig. 6 is a detail sectional view showing another means for holding the strips in contact with the rod to be advanced thereby;

Fig. 7 is a view similar to Fig. 1 but showing only one strip and showing a guide for the strip which is modified to permit the bending of the strip about the rod so as to more nearly envelop the same;

Figs. 8 and 9 are sectional views taken on lines 8—8 and 9—9, respectively, of Fig. 7.

Referring to the drawings, the numeral 10 designates generally a supporting structure which may be of any desired size and configuration and upon which the parts are mounted.

Mounted upon the supporting structure 10 and secured thereto in any suitable manner is a guide designated generally by the reference numeral 11 which preferably embodies two members 12 and 13, each provided with a recess 14 in the adjacent faces thereof to form a tubular passage when the two sections 12 and 13 of the guide are brought together. These sections are held together in any suitable manner.

At the entrance opening to the guide where the rod 15 enters thereinto is provided a recessed portion 16 to facilitate the entrance of the rod into the guide. This guide 11 may be of any desired length and the lower extremity thereof is preferably tapered as at 17 so as not to interfere with the feeding of the strips, hereinafter described, to the rod.

The opening through the guide 11 is of a diameter only slightly larger than the external diameter of the rod 15 so as to allow the rod to pass freely therethrough, and yet contact with the walls of the opening to form an electrical connection between the guide and the rod. The rod is fed in any suitable manner well known in automatic welding machines such as by means of rollers 18 driven in any suitable manner (not shown).

Supported by the guide 11 in any suitable manner, is a tubular member 19 which projects below the end of the guide 11 and is of an internal diameter adjacent the end of the guide 11 somewhat greater than the external diameter of the latter. This tubular member 19 tapers to a point in close proximity to the rod 15 and is provided with openings 20 in the wall thereof.

Supported by the tubular member 19 are resilient members 21 preferably in the form of springs, one end of which is anchored as at 22 to the tubular member 19 and the springs are located on the outside of the tubular member. The extremities 23 of the springs are bowed inwardly as shown so as to pass through the openings 20 and the bowed portions 23 stand in close proximity to the rod 15.

Mounted also upon the support 10 are supplies of flame producing elements 24, preferably in the form of flexible continuous strips of material which are wound upon drums, the latter being rotatably supported as at 25, one preferably on each side of the guide 11. These flame producing elements 24 are preferably provided with a coating of fluxing material on one face thereof and which face is disposed toward the rod 15 as the strips are fed.

The strips are threaded through the tubular member 19 and beneath the bowed ends 23 of the springs 21 so that the flux carrying surface of the strips will be in contact with the periphery of the rod 15. The tension of the springs 21 is such that when the strips 24 are held in contact with the rod 15, and the latter is advanced, the tractive force between the relatively rougher surface of the rod and the contacting surface of the strips 24 will be greater than the friction created by the other or smoother surface of the strips 24 with the portions 23 of the springs 21, with the result that when the rod 15 is advanced the strips 24 will be simultaneously advanced by the movement of the rod and the rod and strips when placed in contact therewith are fed to the work 25 directly as formed or the strips 24 applied to the surface of the rod.

As shown in Fig. 4 the strips 24 are preferably of a width somewhat greater than the diameter of the rod 15 so that an envelope or shielded arc will be formed about the work and thereby protect the arc against deleterious or corroding action of the air and foreign particles.

Obviously the surface of the bowed portions 23 of the springs 21 may be of a configuration to cause the strips 24 to assume the shape shown in Figure 5.

The positive side of the current is supplied to the rod through a conductor 26 which is secured by means of a binding post or connection 27a with the guide 11.

Any other suitable means may be provided for holding the strips in contact with the surface of the rod 15 to be advanced thereby, and as shown in Figure 6, the tubular member 27 which corresponds with the tubular member 19 may be provided with slots 28 in the inclined walls thereof. Rollers 29 having trunnions 30 may be provided and adapted to be inserted into the tubular member 27 so that the trunnions will project into and move within the respective slots 28. The peripheries of the rollers 29 may be grooved to hold the strips 24 in contact with the surface of the rod and as the rod is advanced the rollers 29 will rotate upon their trunnions 30 and will maintain the strips in close proximity to the rod.

Obviously, any other form of means for holding the strips in contact with the rod may be employed. In each instance, however and as in electric arc welding machines there is a tendency for a slight backward movement of the rod during the operation of the machine, the springs 21 in the form of the invention shown in Figure 1, and the rollers 29 as shown in Figure 6, will yield slightly to permit of such a slight backward movement.

It will therefore be manifest that with the present invention there is provided a device for introducing a flame and flux element at the point of welding in a continuous automatic arc welding process. The fluxing agent being abrasive and applied to the inside of the flame agent passing through the tapered hollow tubes will be held in contact with the rod or electrode which passes through the guide 11 and by reason of the contact of the abrasive side of the strip with the rod, the electrode will exert a tractive effort on the strip to cause the same to advance with the rod.

From the foregoing it will be observed that I have provided also a method of forming a welding element whereby the welding rod or wire is supplied with the flux carrying or flame producing agent in the form of strips supplied to opposite sides of the wire as the wire and strips are advanced as a welding element in the welding zone and that the strips which are preferably wider than the wire will on burning produce gases which will shield the arc from the air and thus effect a weld on the shielded arc principle.

While I have shown the flame producing element as composed of two separate strips simultaneously fed to operative position on opposite sides of the welding rod 15 and this is the preferred construction, in some instances I may use only a single strip and provide a suitable guide mechanism similar to the member 19 but modified to permit the bending of the strip about the rod so as to more nearly envelop the same than is the case of the specific construction shown in Fig. 1, and thus permit the use of a single strip instead of two strips. The manner of bending a single strip to more clearly envelope rods is well known to those skilled in the art and one form thereof is illustrated in Figs. 7, 8 and 9 wherein the tubular member is funnel shaped.

While the preferred forms of the invention have been herein shown and described, it is to be understood that various changes may be made in the details of construction and in the combination and arrangement of the several parts, within the scope of the claims, without departing from the spirit of this invention.

What I claim as my invention is:

1. The method of automatic electric arc welding which consists in feeding a continuous length of electrode wire to an arc struck between the wire and the material to be welded, supplying electric current to the wire at a point removed from the arc, feeding a flux in the form of a flat tape to the wire and parallel therealong at a point between the arc and the point of supplying current to the electrode wire, and deforming said flux tape about said electrode wire to substantially completely enclose the latter.

2. The method of automatic electric arc welding which consists in feeding a continuous length of electrode wire to an arc struck between the wire and the material to be welded, supplying electric current to the wire at a point removed from the arc, feeding a flux in the form of a plurality of flat tapes to the wire and parallel therealong at a point between the arc and the point of supplying current to the electrode wire, compressing the tapes against the electrode but maintaining open gaps between the adjacent edges of the tapes, whereby when the electrode and tapes are operative the flames of the tapes overlap to protect the arc.

3. The method of automatic electric arc welding which consists in feeding a continuous length of electrode wire to an arc struck between the wire and the material to be welded, supplying electric current to the wire at a point removed from the arc, feeding flux in the form of strip material to the wire and parallel therealong at a point between the arc and the point of supplying current to the electrode wire, deforming said material about the wire but maintaining an open gap between adjacent edges of the material, whereby when the electrode and strip material are operative the flame of the strip material completely envelops the electrode to protect the arc.

4. In an arc welding apparatus, the combination of a welding wire, means for feeding the wire toward the work to be welded, means providing a source of supply of strip material conducive to the formation of the weld, a chute having an enlarged end arranged to receive the wire and strip material and having a narrow outlet conforming substantially to the shape of the wire and associated strip material to prevent displacement of the wire and material at the outlet, said chute having means disposed intermediate the ends thereof for deforming the strip material about the wire.

5. In an arc welding apparatus, the combination of a welding wire, means for feeding the wire toward the work to be welded, means providing a source of supply of strip material conducive to the formation of the weld, a chute having an enlarged end arranged to receive the wire and strip material and having means within the chute for deforming the strip material about the wire and having a narrow outlet conforming substantially to the shape of the wire and associated strip material to prevent displacement of the wire and material at the outlet.

6. In an arc welding apparatus, the combination of a welding wire, means for feeding the wire toward the work to be welded, means providing a source of supply of strip material conducive to the formation of the weld, a chute having an enlarged end arranged to receive the wire and strip material and having means within the chute for compressing the strip material to the wire and having a narrow outlet conforming substantially to the shape of the wire and associated strip material to prevent displacement of the wire and material at the outlet.

WALLACE V. EMERY.